(12) United States Patent
Toshiaki

(10) Patent No.: US 7,433,022 B2
(45) Date of Patent: Oct. 7, 2008

(54) AUTO LEVEL WITH A LASER

(76) Inventor: Kaneda Toshiaki, 1-28-2-203 Momijigaoka Fuchu-Shi, Tokyo (JP)

( * ) Notice: Subject to any disclaimer, the term of this patent is extended or adjusted under 35 U.S.C. 154(b) by 771 days.

(21) Appl. No.: 11/020,379

(22) Filed: Dec. 22, 2004

(65) Prior Publication Data

US 2006/0133254 A1     Jun. 22, 2006

(51) Int. Cl.
  *G01C 3/08* (2006.01)
  *G02B 23/02* (2006.01)
(52) U.S. Cl. .................... 356/4.01; 359/431
(58) Field of Classification Search .......... 356/4.01, 356/5.01, 28, 141.1; 359/399, 431
See application file for complete search history.

(56) References Cited

U.S. PATENT DOCUMENTS

| | | | | |
|---|---|---|---|---|
| 3,515,480 A | * | 6/1970 | Korones et al. ............ 356/5.01 |
| 6,441,887 B1 | * | 8/2002 | Kao ........................ 356/4.01 |
| 7,012,688 B2 | * | 3/2006 | Northby ..................... 356/337 |
| 7,177,015 B2 | * | 2/2007 | Ohtomo et al. ............. 356/5.13 |
| 2005/0200949 A1 | * | 9/2005 | Shirai et al. ................. 359/399 |
| 2006/0039065 A1 | * | 2/2006 | Dunne ....................... 359/399 |

* cited by examiner

*Primary Examiner*—Isam Alsomiri
(74) *Attorney, Agent, or Firm*—Joe Nieh

(57) ABSTRACT

The auto level with a laser radiates laser light along an optical axis of a visible optical system and comprises of a visible optical system with an automatic horizontal compensation mechanism prism mirror and a beam splitter disposed between an objective lens and an eyepiece. The auto level with a laser is capable of measuring from 5 meters to 300 meters when using the laser light and 0.8 meters to infinity when using the optical sight.

5 Claims, 2 Drawing Sheets

AUTO LEVEL WITH A LASER

BACKGROUND

1. Field of Invention

The present invention relates generally to levels. More specifically, the present invention relates to an auto level with a laser light that may be used in any lighting condition.

2. Description of Related Art

A conventional laser level can only be used indoors, or dark lighting conditions, due to the low visibility of the laser dot in bright lighting conditions, such as during daylight. Furthermore, conventional laser level has a very limited range of measurement.

BRIEF SUMMARY OF THE INVENTION

The present invention is an auto level with a laser that is capable of measuring from 5 meters to 300 meters when using the laser light and 0.8 meters to infinity when using the optical sight. An object of the present invention is to design an auto level with a laser that is as accurate as the conventional auto-level but that can also precisely measure the distance of the object by optical sight. Another object of the present invention is to design an auto level capable of measuring the distance to an object both during daytime and nighttime.

The auto level with a laser radiates laser light along an optical axis of a visible optical system and comprises of a visible optical system with an automatic horizontal compensation mechanism prism mirror and a beam splitter disposed between an objective lens and an eyepiece.

DETAILED DESCRIPTION OF THE PREFERRED EMBODIMENT

Figure 1:
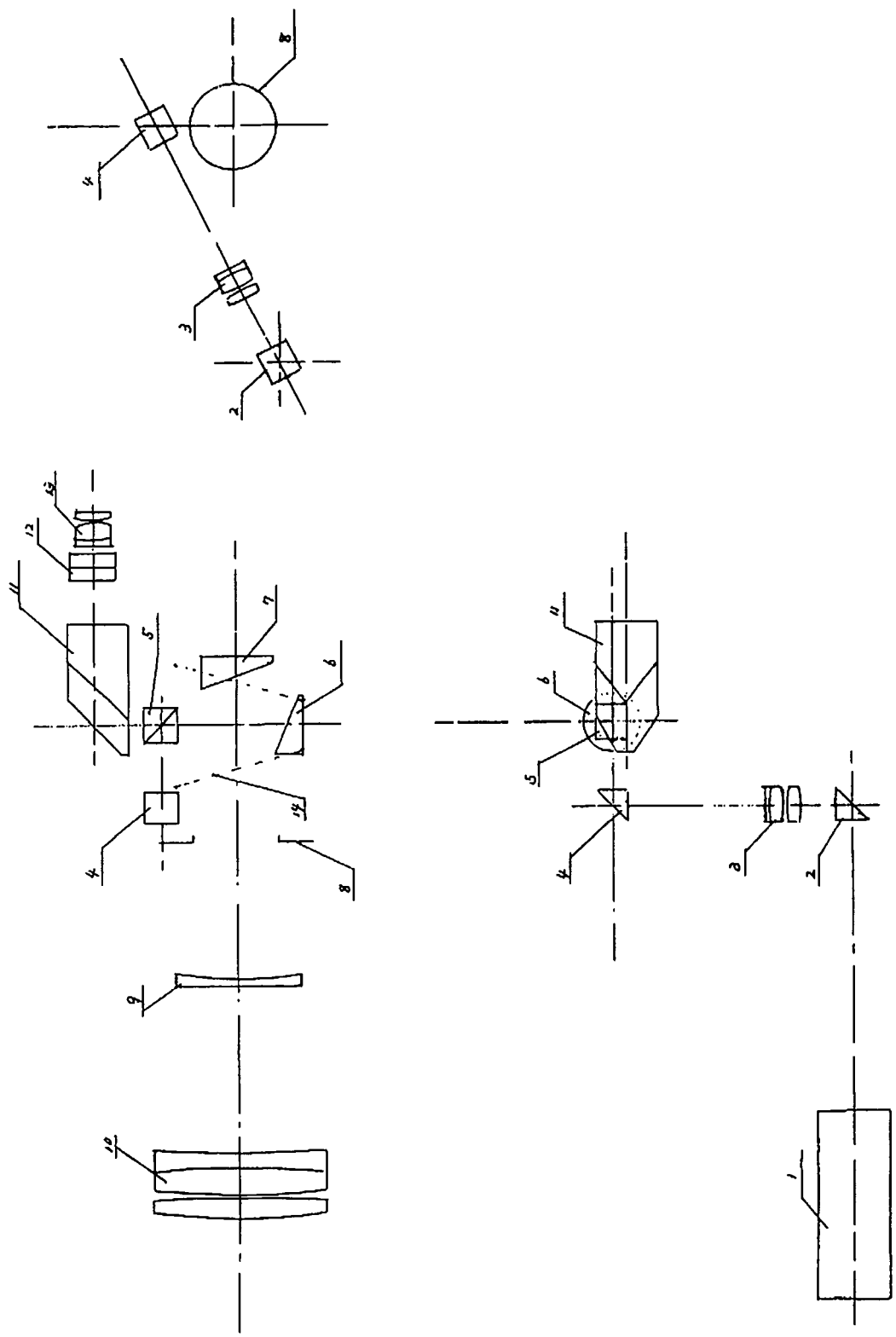
FIG. 1 shows the preferred embodiment of the auto level with a laser.
Figure 2:
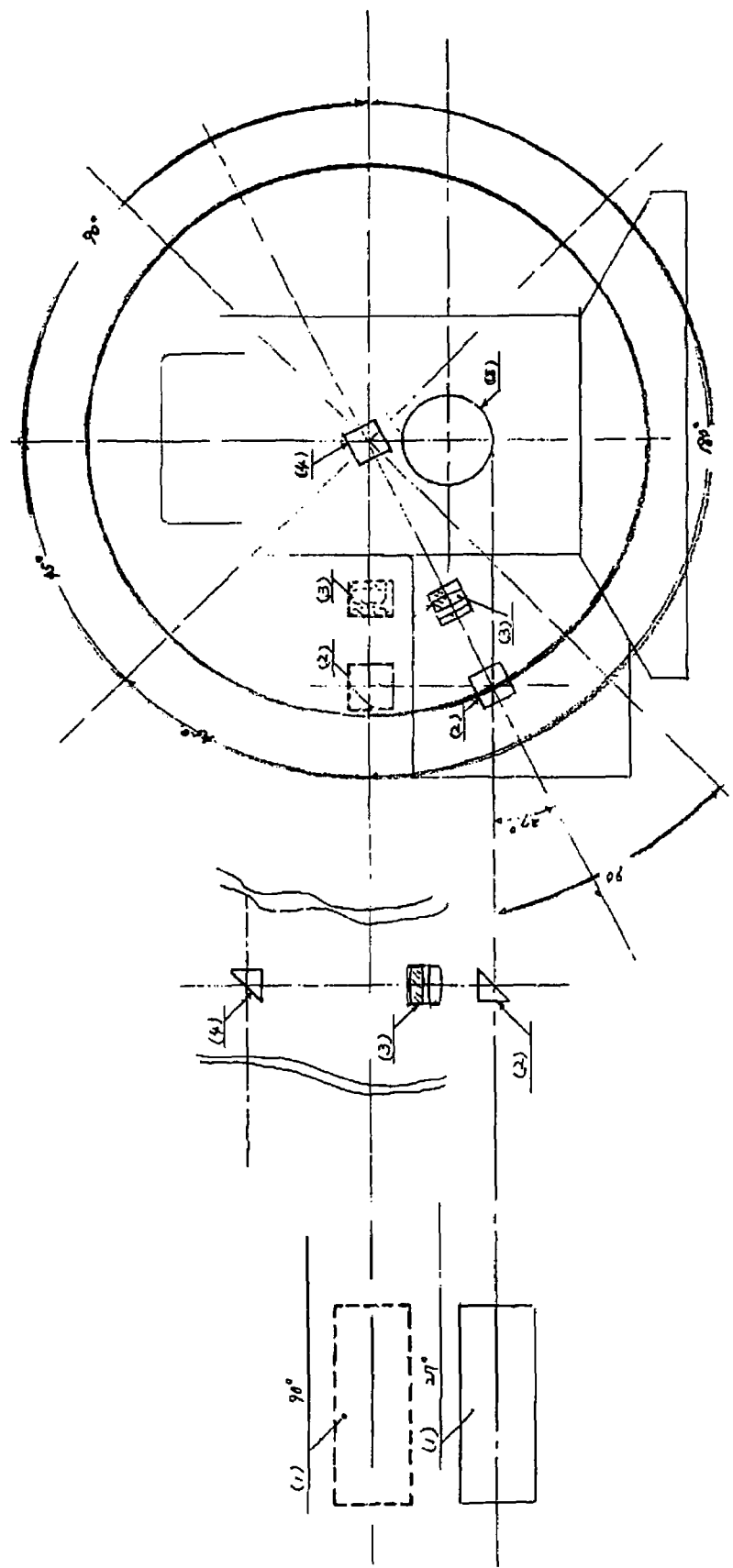
FIG. 2 shows another view of the preferred embodiment of the auto level with a laser.

The following description and figures are meant to be illustrative only and not limiting. Other embodiments of this invention will be apparent to those of ordinary skill in the art in view of this description.

The preferred embodiment of the auto level with a laser comprises of a housing, a laser irradiating unit 1 disposed and affixed within the housing and irradiating a laser light, a first right angle prism 2 positioned in the path of the laser light from the laser irradiating unit 1, a focus lens lupe 3 positioned behind the right angle prism 2 and in the path of the laser light, a second right angle prism 4 positioned behind the focus lens lupe 3 and in the path of the laser light, a polarization beam antenna 5 positioned behind the second right angle prism 4, an operate prism mirror 6 positioned adjacent to the polarization beam antenna 5, a reflection prism mirror 7 positioned adjacent to and generally in between the polarizing beam antenna 5 and the operate prism mirror 6, a diaphragm frame 8 disposed adjacent to the operate prism mirror 6, a focus lens 9 positioned opposite the reflection prism mirror 7, an objective lens 10 positioned behind the focus lens 9, a top prism 11 positioned adjacent to the polarization beam antenna 5, a focus glass 12 comprising a scale, a contact multiplier, and a contact plus positioned adjacent to the top prism 11, an eyeglass 13 positioned behind the focus glass 12, and four hanger strings 14 connecting the operate prism mirror 6 to the housing.

In the preferred embodiment of the present invention, the auto level with a laser comprises of an S component (Semi-conductor laser component) of linear polarized laser light having a preferred wavelength of 633 mm radiating from a laser irradiating unit 1 disposed such that the laser light is irradiated on a right angle prism 2 and reflected, refracting at 90 degrees, and adjusted at a focal light and focus lens and loupe 3 on a 27 degree angle, irradiates at right angle prism 4, and enters a polarization beam splitter 5 at a 90 degree refraction. The S component of the linear polarized laser light is reflected by the beam splitter 5, and penetrates a P component of linear polarized laser light of the same wavelength with both the P and S components of visible light of wavelength shorter than 633 mm penetrate. The S component of linear polarized light which enters beam splitter 5 is reflected by an automatic horizontal mechanism operation prism mirror 6 which is held by four hanging threads 14, is irradiated onto a reflection prism mirror 7, and passes a focus lens 9. The light is radiated along the optical axis of the eyepiece optical system from objective lens 10, and is focused on the target object. Both a prism 11 and a polarization prism splitter 5 comprise a prism cluster. The prism cluster is disposed between (a) a focus mirror 12 and objective lens 10 and (b) the eyepiece 13 and make up one section of the visible optical system.

Irradiated from objective lens 10, the light, which shines as a spot light at the target point, passes again through objective lens 10, returning passes through focus lens 9, enters reflection prism mirror 7, enters automatic horizontal operation prism mirror 6, enters and penetrates beam splitter 5 towards eyepiece 13, has the S component of the linear polarized laser light, which was reflected at the target point and returned, cut, and is converted into an image at the prism.

Even with a small spot diameter of the laser light, and the light is used at a distance, the field will not become dark, and a resolution similar to that of an ordinary measuring telescope may be obtained. Virtually no light is lost on the way to the laser light visual optical system and the device can be used in a dark lighting condition. When the device is used for measurement surveying during daytime, the spot diameter can be easily verified by the person measuring and that measurement positioning is simplified. The present invention allows accurate measurement even with an automatic horizontal compensation mechanism operation prism mirror since the spot diameter is constantly adjusted to the center point of a cross line scale.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An auto level with a laser comprising:
    a housing;
    a laser irradiating unit disposed and affixed within said housing and irradiating a laser light;
    a first right angle prism disposed in the path of said laser light;
    a focus lens lupe disposed behind said right angle prism and in the path of said laser light;

a second right angle prism disposed behind said focus lens lupe and in the path of said laser light a polarization beam antenna disposed behind said second right angle prism;

an operate prism mirror disposed adjacent to said polarization beam antenna;

a reflection prism mirror disposed adjacent to and generally in between said polarizing beam antenna and said operate prism mirror;

a diaphragm frame disposed adjacent to said operate prism mirror;

a focus lens disposed opposite the reflection prism mirror;

an objective lens disposed behind said focus lens;

a top prism disposed adjacent to said polarization beam antenna;

a focus glass comprising a scale, a contact multiplier, and a contact plus disposed adjacent to said top prism;

an eyeglass disposed behind said focus glass; and one or more hanger strings connecting the operate prism mirror to said housing.

2. An auto level with a laser as in claim 1, wherein said laser irradiating unit is at the lower 27 degrees position.

3. An auto level with a laser as in claim 1, wherein said laser irradiating unit is at the 90 degrees position.

4. An auto level with a laser as in claim 1, wherein said right angle prism, said focus light, said focus lens lupe, and said right angle prism is arranged linearly.

5. An auto level with a laser as in claim 1, wherein there are four hanger strings.

* * * * *